(12) United States Patent
Drasner, III et al.

(10) Patent No.: US 8,783,022 B2
(45) Date of Patent: Jul. 22, 2014

(54) RETROFIT AFTERTREATMENT SYSTEM FOR TREATING DIESEL EXHAUST

(75) Inventors: Henry Joseph Drasner, III, Chaska, MN (US); Andrew Alan Gilb, Prior Lake, MN (US); Paul Anthony Way, Edina, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 406 days.

(21) Appl. No.: 12/846,419

(22) Filed: Jul. 29, 2010

(65) Prior Publication Data

US 2011/0047986 A1 Mar. 3, 2011

Related U.S. Application Data

(60) Provisional application No. 61/234,510, filed on Aug. 17, 2009.

(51) Int. Cl.
*F01N 3/00* (2006.01)
*F01N 3/10* (2006.01)
*F01N 3/02* (2006.01)

(52) U.S. Cl.
USPC ............ 60/295; 60/276; 60/286; 60/297; 60/301; 60/311

(58) Field of Classification Search
USPC ............ 60/276, 286, 295, 297, 301, 303, 311
See application file for complete search history.

(56) References Cited

U.S. PATENT DOCUMENTS

| | | | |
|---|---|---|---|
| 6,167,698 B1 | 1/2001 | King et al. | |
| 6,622,480 B2 | 9/2003 | Tashiro et al. | |
| 6,947,831 B2 | 9/2005 | van Nieuwstadt | |
| 7,017,338 B2 | 3/2006 | van Nieuwstadt | |
| 7,055,309 B2 | 6/2006 | Plote et al. | |
| 7,155,331 B1 | 12/2006 | Zhang et al. | |
| 7,178,328 B2 | 2/2007 | Solbrig | |
| 7,337,607 B2 | 3/2008 | Hou et al. | |
| 7,340,888 B2 | 3/2008 | Zhang et al. | |
| 7,343,735 B2 | 3/2008 | Wang et al. | |
| 7,861,521 B2 | 1/2011 | Zhang et al. | |
| 7,862,640 B2 | 1/2011 | Zhang et al. | |
| 2003/0167757 A1 | 9/2003 | Boretto et al. | |
| 2006/0032217 A1* | 2/2006 | Kondou et al. | 60/297 |
| 2006/0086080 A1 | 4/2006 | Katogi et al. | |
| 2008/0010974 A1 | 1/2008 | Frazier et al. | |

(Continued)

FOREIGN PATENT DOCUMENTS

WO WO 2008035623 A1 * 3/2008 ................ F01N 3/08

*Primary Examiner* — Audrey K Bradley
(74) *Attorney, Agent, or Firm* — Merchant & Gould P.C.

(57) ABSTRACT

An exhaust aftertreatment system for diesel engines includes a filtration station, a NOx reduction station, a temperature sensor, a pressure data generator, a NOx sensor, a reductant dispenser, and a controller. The filtration station filters particulate material from the exhaust. The NOx reduction station reduces NOx concentration in the exhaust. The temperature sensor generates first data that is representative of a temperature of the exhaust. The pressure data generator generates second data that is indicative of a pressure differential across a control volume that is located at the NOx reduction station. The control volume includes at least one catalyzed substrate. The NOx sensor generates third data that is representative of the NOx concentration in the exhaust. The reductant dispenser dispenses reductant into the exhaust. The controller controls a dosing rate of the reductant dispenser. The controller uses the first, second, and third data to determine the dosing rate.

22 Claims, 10 Drawing Sheets

(56) References Cited

U.S. PATENT DOCUMENTS

| | | | |
|---|---|---|---|
| 2008/0271440 A1* | 11/2008 | Xu et al. | 60/295 |
| 2008/0302089 A1 | 12/2008 | Way et al. | |
| 2008/0314033 A1* | 12/2008 | Aneja et al. | 60/297 |
| 2009/0000287 A1 | 1/2009 | Blaisdell et al. | |
| 2009/0100809 A1* | 4/2009 | Baldwin et al. | 55/318 |
| 2010/0005787 A1* | 1/2010 | Hosoya et al. | 60/286 |
| 2010/0170234 A1 | 7/2010 | Way et al. | |
| 2010/0212301 A1 | 8/2010 | De Rudder et al. | |

* cited by examiner

RETROFIT AFTERTREATMENT SYSTEM FOR TREATING DIESEL EXHAUST

CROSS-REFERENCE TO RELATED APPLICATION

This application claims the benefit of U.S. Provisional Patent Application Ser. No. 61/234,510, filed Aug. 17, 2009, which application is hereby incorporated by reference in its entirety.

TECHNICAL FIELD

The present disclosure relates generally to exhaust treatment systems for controlling exhaust emissions. More particularly, the present disclosure relates to exhaust treatment systems for reducing NOx and particulate matter emissions from diesel engine exhaust.

BACKGROUND

Diesel engine exhaust contains contaminants the emission of which is regulated for environmental and health reasons. Example contaminants present in diesel engine exhaust include particulate matter, nitrogen oxides (NOx), hydrocarbons (HC) and carbon monoxide (CO).

The particulate matter in diesel engine exhaust generally constitutes a soluble organic fraction ("SOF") and a remaining portion of hard carbon. The soluble organic fraction may be partially or wholly removed through oxidation in an oxidation catalyst device such as a catalytic converter. However, catalytic converters are typically capable of producing a reduction of only about 20% of the total particulate emissions. Therefore, vehicles equipped with diesel engines may have exhaust aftertreatment systems that include diesel particulate filters for more completely removing the particulate matter from the exhaust stream, including the hard carbon portion. Conventional wall-flow type diesel particulate filters may have particulate removal efficiencies that exceed 85%.

In addition to particulate filters for removing particulate matter, diesel exhaust treatment systems can include structures for removing other undesirable emissions such as carbon monoxide (CO), hydrocarbons (HC) and nitrogen oxides (NOx). Catalytic converters can be used to remove CO and HC. NOx can be removed by structures such as lean NOx catalysts, selective catalytic reduction (SCR) catalysts and lean NOx traps.

Lean NOx catalysts are catalysts capable of converting NOx to nitrogen and oxygen in an oxygen rich environment with the assistance of low levels of hydrocarbons. For diesel engine exhaust, hydrocarbon emissions are generally too low to provide adequate NOx conversion. Thus, hydrocarbons are typically required to be injected into the exhaust stream upstream of the lean NOx catalysts.

Lean NOx traps use materials such as barium oxide to absorb NOx during lean burn operating conditions. During fuel rich operations, the NOx is desorbed and converted to nitrogen and oxygen by catalysts within the lean NOx traps.

SCR systems typically use ammonia as a reductant for reducing NOx to $N_2$. A typical SCR system includes an SCR substrate having an SCR catalyst such as an iron based catalyst, a copper based catalyst or other metal based catalyst. In a typical NOx reduction reaction, the catalyst provided on the SCR substrate promotes the reaction of ammonia with NOx to form $N_2$ and $H_2O$. This reaction is favored by the presence of excess oxygen. In certain SCR systems, a urea-water solution is provided as a reductant source for use in the reduction of NOx. However, to function as an effective reductant, the urea-water solution must be decomposed into a useable reductant form (i.e., ammonia). To decompose the urea-water solution, the water in the solution is first removed through vaporization. Next, the urea decomposes via thermolysis to form isocyanic acid (HNCO) and ammonia ($NH_3$). Finally, the HNCO decomposes via hydrolysis to form $NH_3$ and carbon dioxide. The effective decomposition of the urea-water solution to ammonia is assisted through effective mixing.

Regulations relating to diesel engine exhaust emissions are becoming increasingly more stringent. As the regulations on the level of contaminants in diesel engine exhaust become more stringent, it is often necessary to upgrade the diesel exhaust aftertreatment systems present on preexisting diesel engine powered vehicles. Retrofit exhaust aftertreatment systems are used to upgrade the level of emission control provided on existing diesel engine powered vehicles so as to comply with the ever changing emission control regulations.

SUMMARY

Aspects of the present disclosure relate to retrofit aftertreatment systems for reducing emissions in diesel engine exhaust. In certain embodiments of the present disclosure, the retrofit aftertreatment systems can be quickly installed with little to no calibration at the time of installation and can be operated with little to no engine interaction. Another aspect of the present disclosure relates to a retrofit aftertreatment system providing a "one size fits all" solution compatible with mechanical and electronic diesel engines used for on-road and off-road environments.

Examples representative of a variety of inventive aspects are set forth in the description that follows. The inventive aspects relate to individual features as well as combinations of features. It is to be understood that both the foregoing general description and the following detailed description merely provide examples of how the aspects may be put into practice, and are not intended to limit the broad spirit and scope of the aspects.

DETAILED DESCRIPTION

The present disclosure relates to diesel exhaust aftertreatment systems that can effectively be used in retrofit applications for treating diesel exhaust from mechanically and/or electronically controlled diesel engines. In certain embodiments, the diesel aftertreatment systems can be installed and used with minimal to no engine interaction. One example embodiment includes a control volume including a catalyzed substrate, a particulate filter positioned upstream from the control volume, a pressure data generator for generating pressure data indicative of a pressure differential across the control volume, a dispenser (e.g., an injector) for dispensing a reactant into the exhaust being treated and an electronic controller for controller the reactant dispensing rate. The control volume has known flow characteristics. The pressure data indicative of a pressure differential across the control volume can include an actual differential pressure reading or a pressure reading used by the electronic controller to estimate a pressure differential across the control volume (e.g., via a model developed through empirical testing). The pressure data indicative of the pressure differential across the control volume is related to flow and can be used by the electronic controller to determine (i.e., calculate, estimate, look-up from a table) the exhaust flow rate of the diesel exhaust passing through the aftertreatment system. The electronic controller uses the pressure data indicative of the pressure differential across the control volume as a factor (i.e., a parameter) for determining the dosing rate of the reactant dispensed into the diesel exhaust by the dispenser. In a preferred embodiment, the dosing rate is directly dependent upon the magnitude of the pressure differential across the control volume. Other data (e.g., exhaust temperature) also can be used as a dosing control parameter in combination with the pressure data indicative of the pressure differential across the control volume.

Figure 1A:
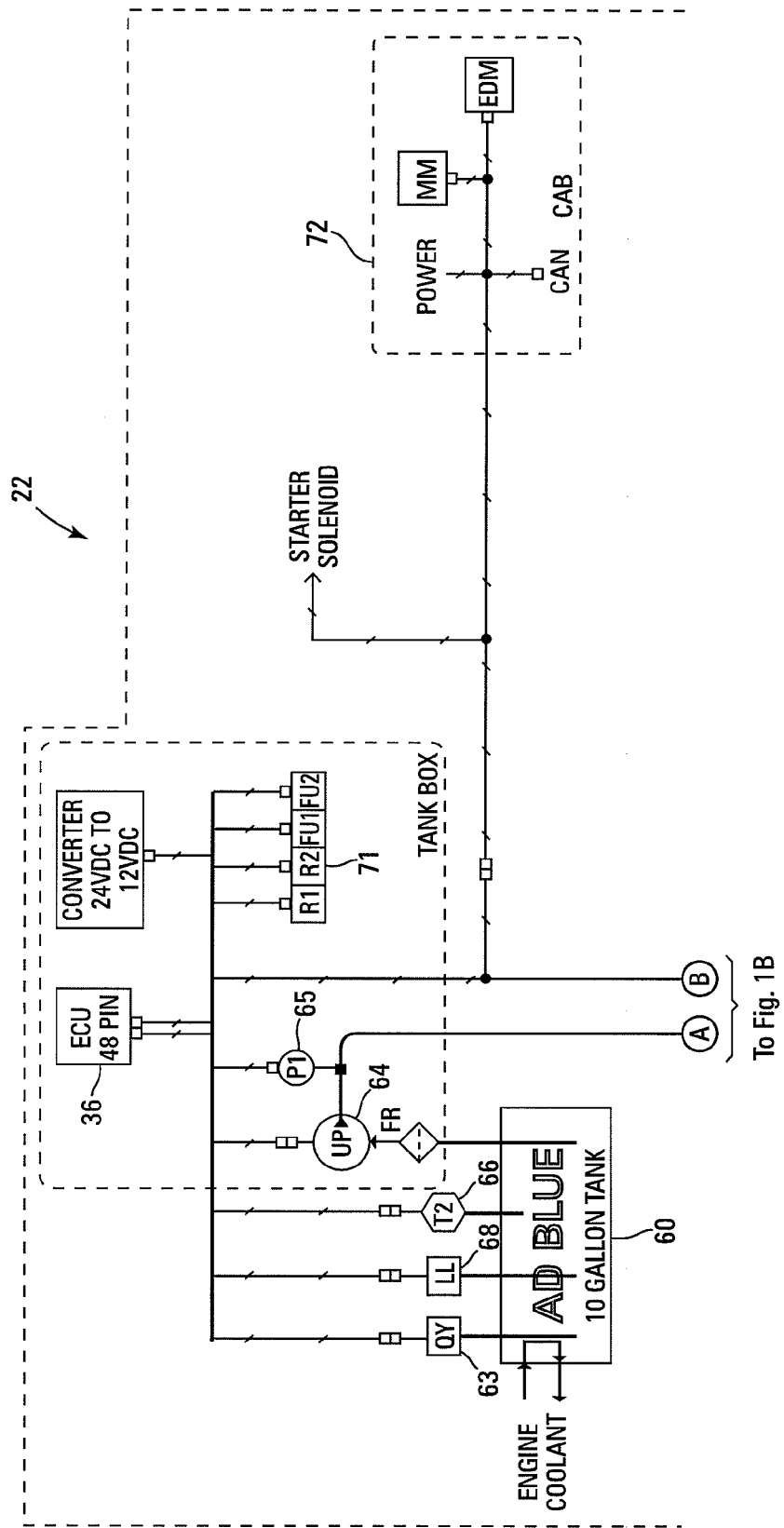
FIGS. 1A and 1B schematically illustrate an exhaust aftertreatment system in accordance with the principles of the present disclosure.
Figure 1B:
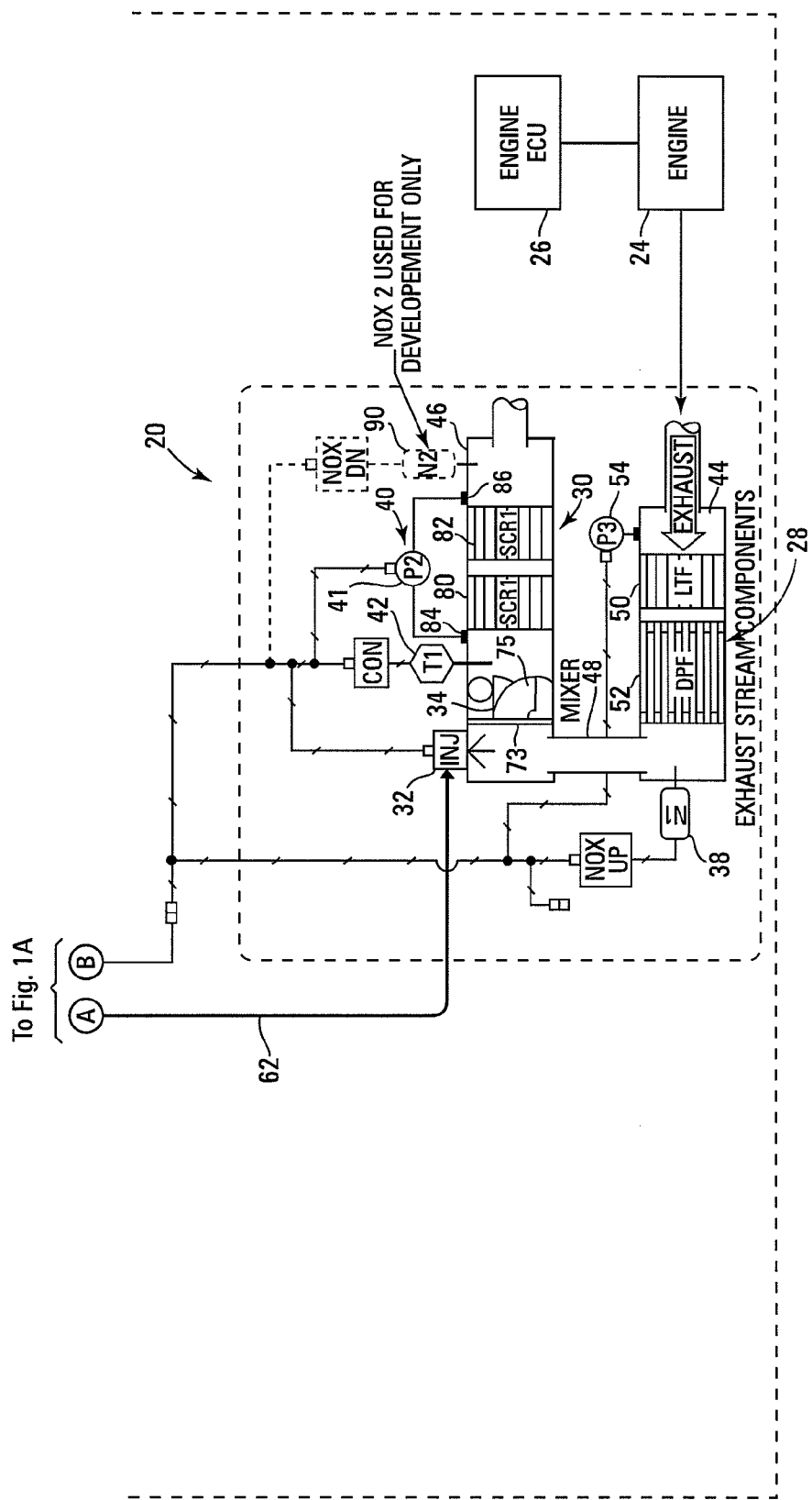
Figure 2:
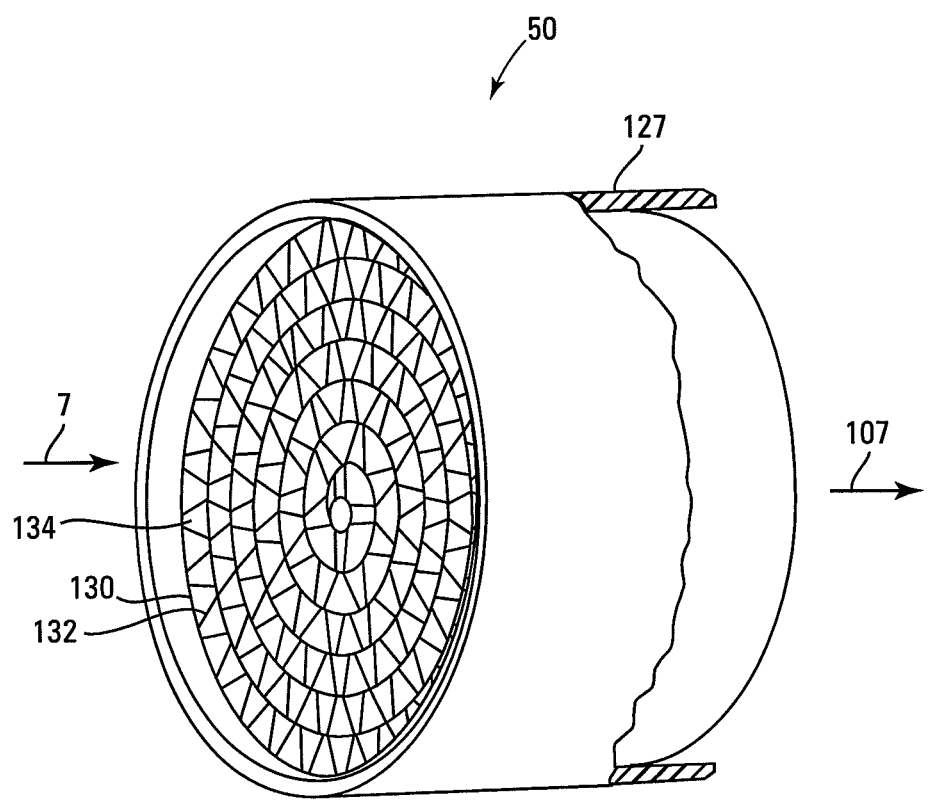
FIG. 2 is a perspective view of an example pre-filter that can be used in the system of FIGS. 1A and 1B.
Figure 3:
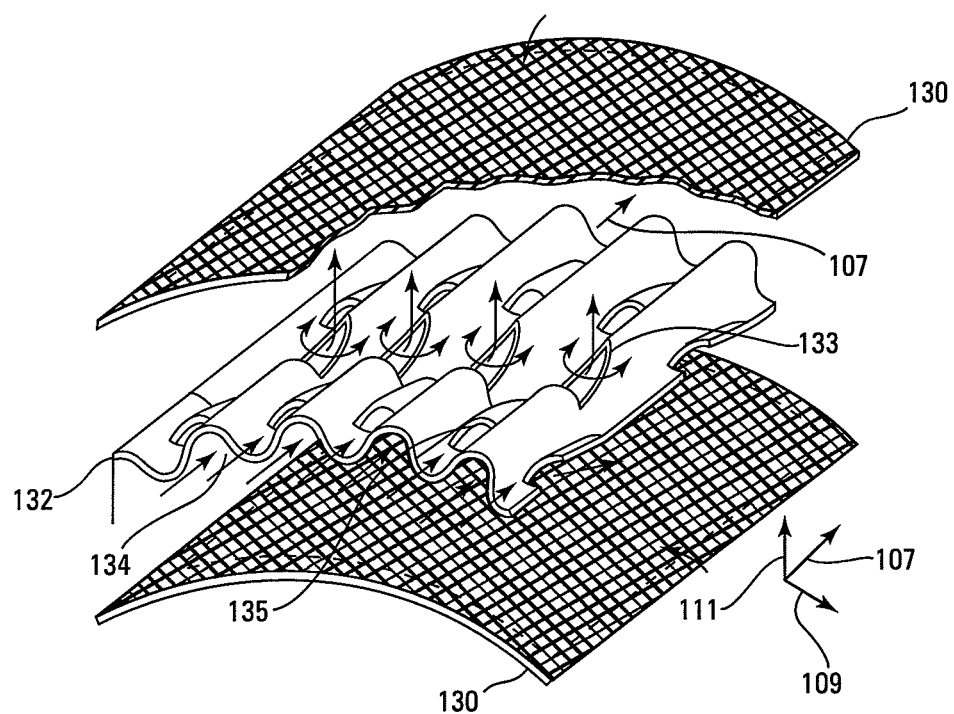
FIG. 3 is a perspective view of a portion of the pre-filter of FIG. 2.
Figure 4:
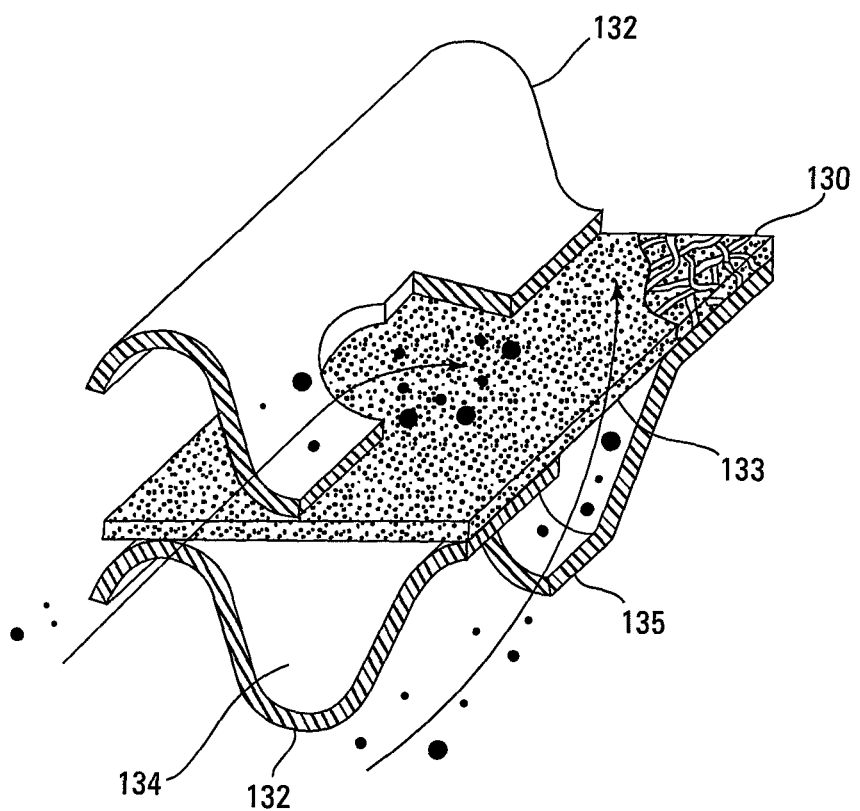
FIG. 4 is a perspective view of another portion of the pre-filter of FIG. 2.

FIGS. 1A and 1B illustrate a diesel exhaust aftertreatment system 20 in accordance with the principles of the present disclosure. The diesel exhaust aftertreatment system 20 is shown installed on a vehicle 22 powered by a diesel engine 24. Operation of the diesel engine 24 can be controlled by an engine electronic control unit 26 that controls the various operating parameters of the diesel engine 24, but the engine could also be mechanically controlled. The diesel exhaust aftertreatment system 20 includes a filtration station 28 positioned upstream from a NOx reduction station 30. The filtration station 28 is adapted for filtering particulate matter from the diesel exhaust generated by the diesel engine 24 while the NOx reduction station 30 is adapted for converting NOx present in the diesel exhaust generated by the engine 24 into $N_2$ and $H_2O$. A reactant dispenser such as a reductant injector 32 is positioned between the filtration station 28 and the NOx reduction station 30. The reductant injector 32 injects a reductant (e.g., a urea-water solution that decomposes into ammonia after injection, ammonia, a hydrocarbon or other reductant) that reacts with NOx at the NOx reduction station 30 to convert the NOx into $N_2$ and $H_2O$. An exhaust mixer 34 is positioned between the reductant injector 32 and the NOx reduction station 30.

The diesel exhaust aftertreatment system 20 also includes an electronic control unit 36 that interfaces with various sources of data (e.g., sensors) and uses the data received from the sources of data to control the amount of reductant injected into the diesel exhaust by the reductant injector 32 (i.e., the electronic control unit 36 controls the reductant dosing rate). The sources of data can include a NOx sensor 38 that measures the concentration of NOx present in the diesel exhaust at a location between the filtration station 28 and the reductant injector 32. The sources of data can also include a pressure data generator 40 that generates pressure data indicative of the differential pressure across a control volume located at the NOx reduction station 30. In one embodiment, the control volume includes at least one catalyzed substrate at the NOx reduction station. The pressure data is used by the electronic control 36 to identify (i.e., calculate, estimate, look-up on a table, etc.) a real-time differential pressure across the control volume. The sources of data can also include a temperature sensor 42 located between the exhaust mixer 34 and the NOx reduction station 30.

When determining the reductant dosing rate, it is desirable for the NOx reduction reaction that occurs at the NOx reduction station 30 to be at or near a stoichiometric condition. By approaching a stoichiometric condition, sufficient reductant is dosed into the system to adequately remove the NOx from the exhaust stream at the NOx reduction station 30 without providing a significant amount of excess reductant that does not react with NOx at the NOx reduction station 30. Data representative of the total mass flow rate of NOx passing through the system is used to determine a dosing rate that achieves near stoichiometric conditions. The total NOx mass flow rate can be determined based on exhaust flow rate through the aftertreatment system 20 and the concentration of NOx in the diesel exhaust. The electronic control unit 36 can determine an exhaust flow rate value based on the data from the pressure data generator 40 and the concentration of NOx in the exhaust can be determined based on the data from the NOx sensor 38. The exhaust flow rate data can also be used to determine the residence time of the exhaust within the NOx reduction station 30. The temperature data from the temperature sensor 42 along with the exhaust residence time data can be used to determine the chemical reaction efficiency that will occur at the NOx reduction station 30. Once the above information is known, the reductant dosing rate suitable for approaching a stoichiometric condition may readily be identified by the electronic control unit 36.

The diesel exhaust aftertreatment system 20 preferably can easily be installed on the vehicle 22 as a retrofit aftertreatment system with minimal to no calibration required as part of the installation process. The data provided to the electronic control unit 36 by the various sources of data allows the system to effectively operate without requiring the system to substantially interact with the diesel engine 24. For example, the electronic control unit 36 of the diesel exhaust aftertreatment system 20 does not need to access engine operating data (e.g., engine speed, NOx mapping information, exhaust flow mapping information, air intake manifold temperature, air intake manifold pressure, etc.) from the electronic control unit 26 of the diesel engine 24. Also, the approach used by the diesel exhaust aftertreatment system 20 to control the rate of reductant injection does not require remote sensing of engine parameters (e.g., engine speed, air intake manifold temperature, air intake manifold pressure, etc.). However, for some applications, a certain level of interaction may be provided between the diesel engine 24 and the electronic control unit 36. For example, in some embodiments, the electronic control unit 36 may utilize data relating to engine operating conditions in combination with the other sources of data collected from the diesel exhaust aftertreatment system 20.

Referring again to FIGS. 1A and 1B, the filtration station 28 is packaged within a first housing 44 and the exhaust mixer 34 and the NOx reduction station 30 are packaged within a second housing 46. The reductant injector 32 is coupled to the second housing 46 and the NOx sensor 38 is coupled to the first housing 44. A conduit 48 provides fluid communication between the first and second housings 44, 46. In the depicted embodiment, the first and second housings 44, 46 are arranged in a reverse flow orientation in which the diesel exhaust enters the first housing 44 in a first direction and exits the second housing 46 in a second direction that is opposite from the first direction. Of course, other arrangements could be used as well. For example, the first and second housings 44, 46 can be arranged in an in-line arrangement in which the first and second housings 44, 46 are coaxially aligned with one another and exhaust flow passes straight through the diesel exhaust aftertreatment system 20 without turning.

The filtration station 28 is preferably configured to remove a high percentage of particulate matter from the diesel exhaust stream. In a preferred embodiment, the filtration system 28 removes at least 90% of the particulate matter from the exhaust stream that passes through the filtration station 28. In the depicted embodiment, the filtration station 28 includes a pre-filter 50 positioned upstream from a high filtration efficiency filter 52. In one embodiment, the pre-filter 50 is a pass-through filter having a filtration efficiency (i.e., a particulate mass reduction efficiency) in the range of 20-60% and the high filtration efficiency filter 52 is a wall-flow filter having a filtration efficiency greater than 85%. Both filters 50, 52 may be catalyzed to enhance the oxidation of HC, CO and PM. The pre-filter 50 may be catalyzed to promote the conversion of NO to $NO_2$ so as to increase the concentration of $NO_2$ present in the exhaust gas that passes through the high filtration efficiency filter 52. The increased concentration of $NO_2$ at the high filtration efficiency filter 52 assists in combusting particulate matter captured on the high filtration efficiency filter 52 at lower temperatures. Thus, the high filtration efficiency filter 52 can be continuously regenerated at relative low exhaust temperatures.

A pressure sensor 54 can be provided upstream from the filtration station 28 for monitoring the pressure upstream from the filtration station 28. In this way, the pressure sensor 54 can be used to determine if the filtration station 28 becomes excessively plugged or otherwise generates unacceptably high levels of backpressure. For certain embodiments, an active regeneration system (e.g., a heating coil or fuel injection system) can be incorporated into the diesel exhaust aftertreatment system 20 to actively regenerate the filtration station 28. In certain embodiments, the filtration station 28 has a configuration similar to the low temperature diesel particulate matter reduction system disclosed at U.S. patent application Ser. No. 11/725,578, filed Mar. 19, 2007, now U.S. Patent Pub. No. 2007/0240406 A1, that is hereby incorporated by reference in its entirety.

Figure 5:
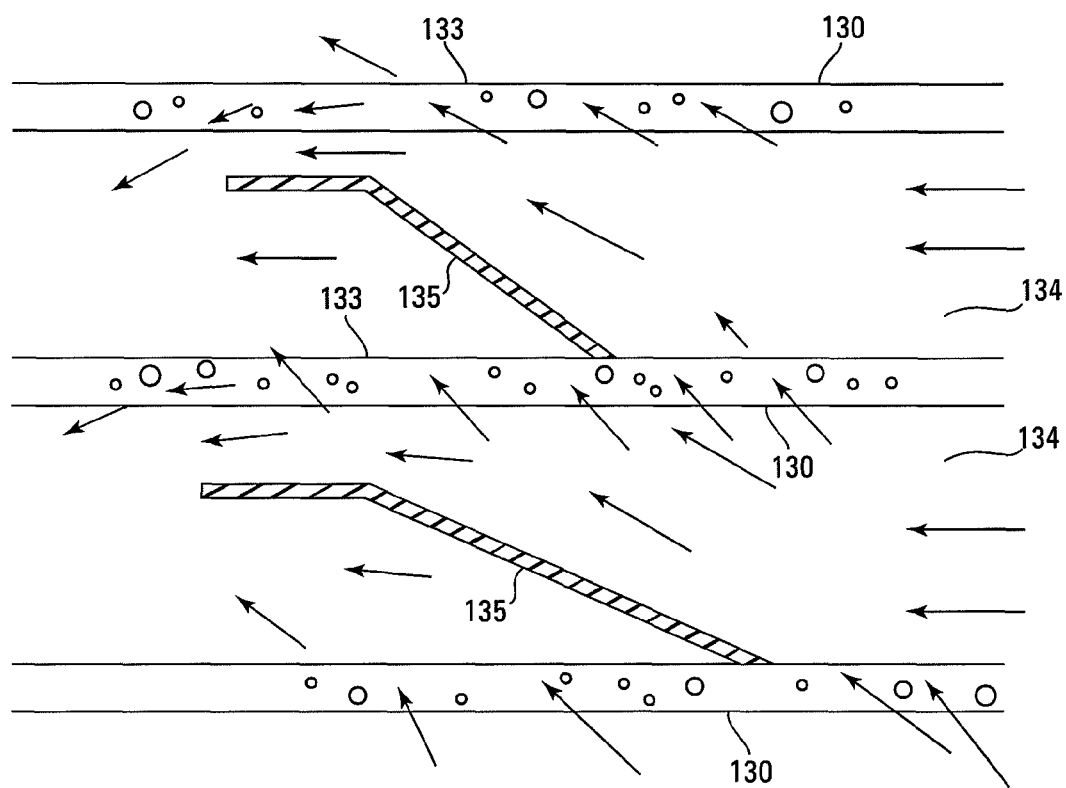
FIG. 5 shows a flow pattern for the pre-filter of FIG. 2.

FIGS. 2-5 show an example configuration for the pre-filter 50. As shown at FIGS. 2-5, the pre-filter 50 includes a canister 127 having a substrate (e.g., a honeycomb body) constructed from multiple layers of filtration materials 130 sandwiched between layers of corrugated metallic foil 132. The corrugated metallic foil 132 defines elongated passageways 134 (i.e., channels) that are generally parallel to a net flow direction 107 of exhaust gases passing through the pre-filter 50. The metallic foil 132 preferably includes structures that generate turbulence for ensuring that mixing occurs within the substrate. In the depicted embodiment, the structures include openings 133 and flow diverting surfaces 135 (i.e., mixing surfaces, deflecting surfaces, mixing shovels, flow diversion structures or like terms). The flow diverting surfaces 135 cause some flow to be diverted within the passageways 134 from the net flow direction 107 to transverse directions 109 and radial directions 111. At least some of the diverted flow travels through the openings 133 between adjacent passageways 134 and through the filtration material 130. As the exhaust flow travels through the filtration material 130, at least some particulate material of the exhaust stream is captured by the filtration material 130. As shown at FIG. 5, the diverting surfaces 135 do not completely block/plug the passageways 134. This assists in keeping the pressure drop across the pre-filter 50 relatively low. In certain embodiments, the pre-filter 50 is manufactured by Emitec GmbH and sold under the name "PM Kat".

Figure 6:
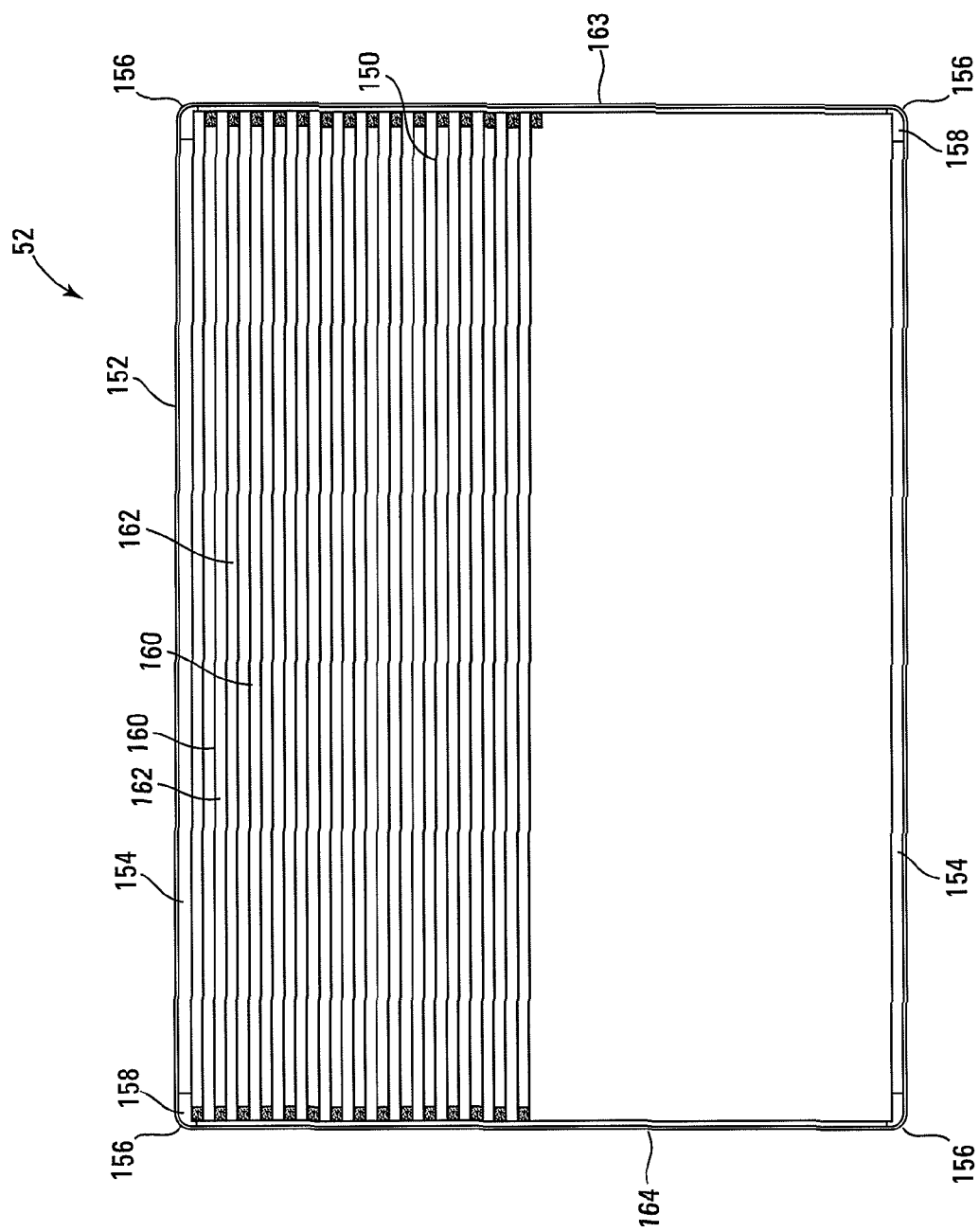
FIG. 6 shows a high filtration efficiency filter that can be used in the system of FIGS. 1A and 1B.
Figure 7:
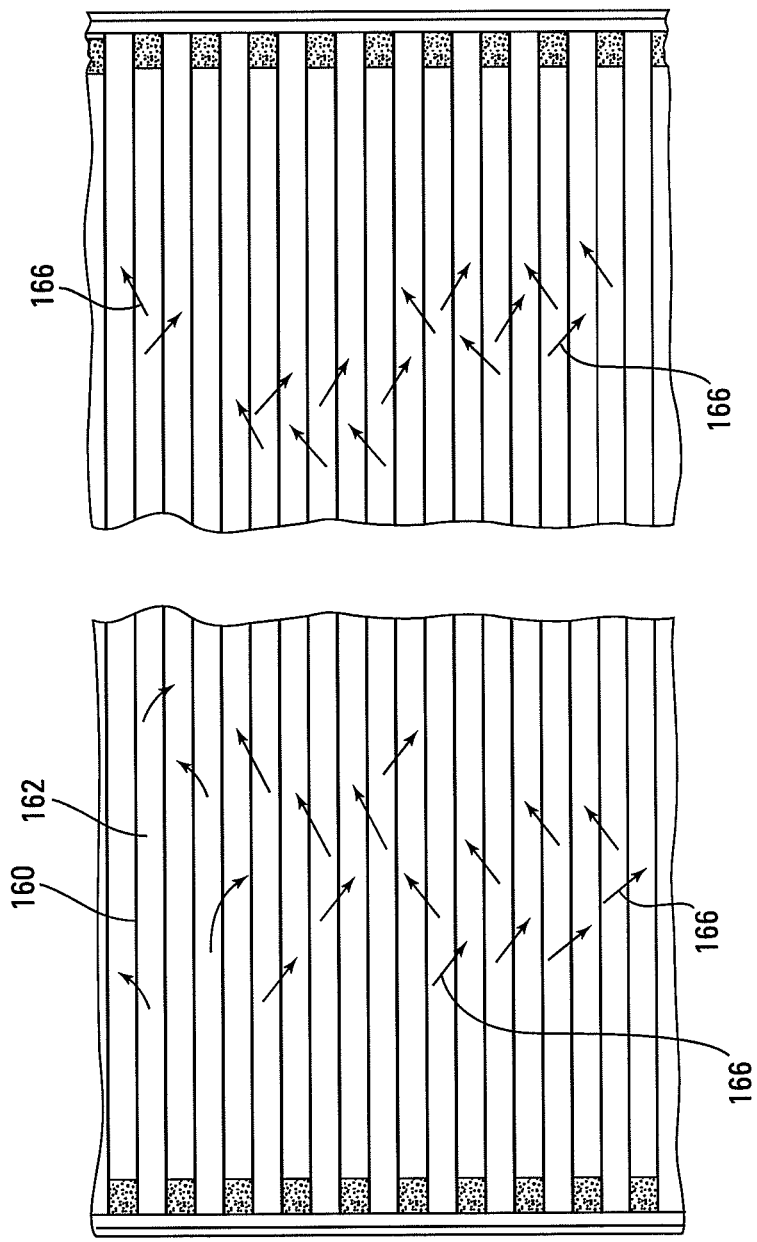
FIG. 7 shows a flow pattern for the filter of FIG. 6.

Referring to FIGS. 6 and 7, an example version of the high filtration efficiency filter 52 is depicted. The depicted filter 52 is a wall-flow filter having a substrate 150 housed within an outer casing 152. In certain embodiments, the substrate 150 can have a ceramic (e.g., a foamed ceramic) monolithic construction. A mat layer 154 can be mounted between the substrate 150 and the casing 152. Ends 156 of the casing 152 can be bent radially inwardly to assist in retaining the substrate 150 within the casing 152. End gaskets 158 can be used to seal the ends of the filter 52 to prevent flow from passing through the mat to bypass the substrate 150. The substrate 150 can include walls 160 defining a honeycomb arrangement of longitudinal passages 162 (i.e., channels) that extend from a downstream end 163 to an upstream end 164 of the substrate 150. The passages 162 are selectively plugged adjacent the downstream and upstream ends 163, 164 such that exhaust flow is forced to flow radially through the walls 160 between the passages 162 in order to pass through the filter 52. As shown at FIG. 7, this radial wall flow is represented by arrows 166. In one embodiment, the filter 52 is a diesel particulate filter sold by Engelhard Corporation under the name "DPX FILTER."

The reductant injector 32 of the diesel exhaust aftertreatment system 20 is preferably mounted in a configuration adapted to minimize the amount of reductant or reductant bi-products that are deposited on the inner surfaces of the diesel exhaust aftertreatment system 20. An example configuration for mounting the reductant injector 32 is disclosed at U.S. Patent Application Ser. No. 61/114,119 that is hereby incorporated by reference in its entirety.

Referring back to FIGS. 1A and 1B, the reductant injector 32 is connected to a reductant tank 60 by a flow line 62. The reductant tank 60 is preferably mounted to the vehicle 22 and contains a reductant such as a urea-water solution. A pump 64 pumps reductant from the reductant tank 60 through the flow line 62 to the reductant injector 32. Engine coolant can be conveyed through one or more conduits that extend around or through the reductant tank 60 to ensure that the reductant within the reductant tank 60 does not overheat. The electronic control unit 36 can interface with a temperature sensor 66 for monitoring the temperature of the reductant within the reductant tank 60, a level sensor 68 for monitoring the level of reductant within the reductant tank 60 and a quality sensor 63 for monitoring the quality of the reductant within the reductant tank. The electronic control unit 36 can also interface with a pressure sensor 65 for monitoring the pressure within the flow line 62.

Referring still to FIGS. 1A and 1B, the electronic control unit 36 also interfaces with various relays 71. Certain of the relays 71 can be linked to components of the vehicle 22. For example, at least one of the relays 71 can be linked to the ignition of the vehicle 22 such that the system 20 is activated upon turning on the ignition. Circuitry may be provided that prevents the engine 24 from starting if the amount of reductant in the reductant tank 60 is below a given level. Power for the system 20 can be provided by an electrical system 72 (e.g., the vehicle battery and alternator) of the vehicle 22.

The exhaust mixer 34 of the diesel exhaust aftertreatment system 20 is configured to mix the exhaust stream before the exhaust stream reaches the NOx reduction station 30. When a urea-water solution is injected by the injector 32, mixing of the diesel exhaust assists in ensuring that the vast majority of the urea injected into the exhaust by the reductant injector 32 has decomposed to ammonia before reaching the NOx reduction station 30. Additionally, mixing of the diesel exhaust helps ensure that the reductant is uniformly distributed within the exhaust stream when the exhaust stream reaches the NOx reduction station 30. The uniform distribution of the reductant within the exhaust stream assists in enhancing the NOx removal efficiency of the NOx reduction station 30.

In one embodiment, the exhaust mixer 34 is configured to generate a swirl-type flow that swirls circumferentially about a central axis of the second housing 46. As depicted in FIGS. 1A and 1B, the exhaust mixer 34 includes a plate 73 defining a plurality of openings. Bent tubes 75 are mounted to the plate 73 so as to cover the openings. Flow through the second housing 46 passes through the openings and into the bent tubes 75. The bent tubes 75 turn the flow to generate a swirl-type flow within the second housing 46. Examples of exhaust mixers that can be used within the diesel exhaust aftertreatment system 20 are disclosed at U.S. patent application Ser. No. 12/120,689, now U.S. Patent Pub. No. 2009/0000287 A1, that is hereby incorporated by reference in its entirety.

The NOx reduction station 30 is shown including first and second SCR substrates 80 and 82 positioned in series. The pressure data generator 40 includes a first pressure sensing location 84 positioned upstream from the first SCR substrate 80 and a second pressure sensing location 86 positioned downstream from the second SCR substrate 82. Thus, the control volume of the system includes the first and second SCR substrates 80, 82. In the depicted embodiment, the pressure data generator 40 includes a pressure differential sensor 41 that monitors the difference in pressure between the first and second pressure sensing locations 84 and 86. In an alternative embodiment, separate pressure sensors can be provided at each of the locations 84, 86 and the electronic control unit 36 can calculate the pressure differential between the two locations 84, 86. In still other embodiments, the second pressure sensing location 86 can be located between the SCR substrates 80, 82 and the first pressure sensing location 84 can be located upstream from the substrate 80 (i.e., the control volume includes only the first substrate 80), or the first sensing location 84 can be located between the substrates 80, 82 and the second sensing location 86 can be located downstream from the substrate 82 (i.e., the control volume includes only the second substrate 82). In further embodiments, a model based approach can be used in which a model is developed through empirical testing (e.g., in a lab) which provides a relationship between the pressure at an upstream side of a control volume and the pressure at a downstream side of a control volume. Once this relationship has been empirically determined, only the upstream pressure reading need be taken (i.e., only the pressure sensing location upstream from the control volume is utilized) in the field during use of the system and the downstream pressure value can be determined based on the pre-determined model to identify the pressure differential. In this way, the electronic control unit 36 can use the pressure data corresponding to the upstream sensing location to identify the pressure differential across a substrate or multiple substrates of the NOx reduction station. In embodiments where the exhaust outlet to atmosphere of the system is in relatively close proximity to the NOx reduction station, the downstream pressure value can be presumed to equal atmospheric pressure thereby eliminating the need for taking a downstream pressure reading.

The electronic control unit 36 uses the identified pressure differential value to determine the exhaust flow rate through the aftertreatment system 20. In one embodiment, the exhaust flow rate can be established through the following formula:

$$Q = A\left[\frac{-\left(\frac{K2\mu}{D}\right)+\left(\sqrt{\left(\frac{K2\mu}{D}\right)^2 - 4K1\rho(-\Delta P)}\right)}{2K1\rho}\right]$$

$\rho = \Delta P/(R*T)$ = Air density $A = \pi*r^2$ = Flow area $\mu$ = Flow viscosity Inputs:
$\Delta P$ = Delta pressure, input from sensor
K1 = Flow coefficient found with flow testing
K2 = Flow coefficient found with flow testing
T = Exhaust temperature, input from sensor
R = Gas constant
r = Core radius
D = Core diameter The above formula shows the relationship between exhaust flow and pressure differential across a control volume (e.g., a substrate such as an SCR substrate, multiple substrates such as multiple SCR substrates, etc.). Via the relationship established by the above formula, the electronic control unit 36 can identify the exhaust flow rate based on the pertinent pressure differential data.

Each of the SCR substrates 80, 82 is preferably coated or otherwise provided with an SCR catalyst. An SCR catalyst is a catalyst that promotes the reaction of a reductant (e.g. ammonia) with NOx to form $N_2$ an $H_2O$. Example SCR catalysts that can be provided on the SCR substrates include iron-based SCR catalysts, copper-based SCR catalysts or other metal-based SCR catalysts. In certain embodiments, the second SCR substrate 82 can be zone coated with a band of oxidation catalyst (e.g., a precious metal) that promotes the reaction of ammonia with oxygen to remove excess ammonia from the exhaust stream before the exhaust is directed to atmosphere. In this way, the band of oxidation catalysts functions as ammonia "clean-up" structure.

Figure 8:
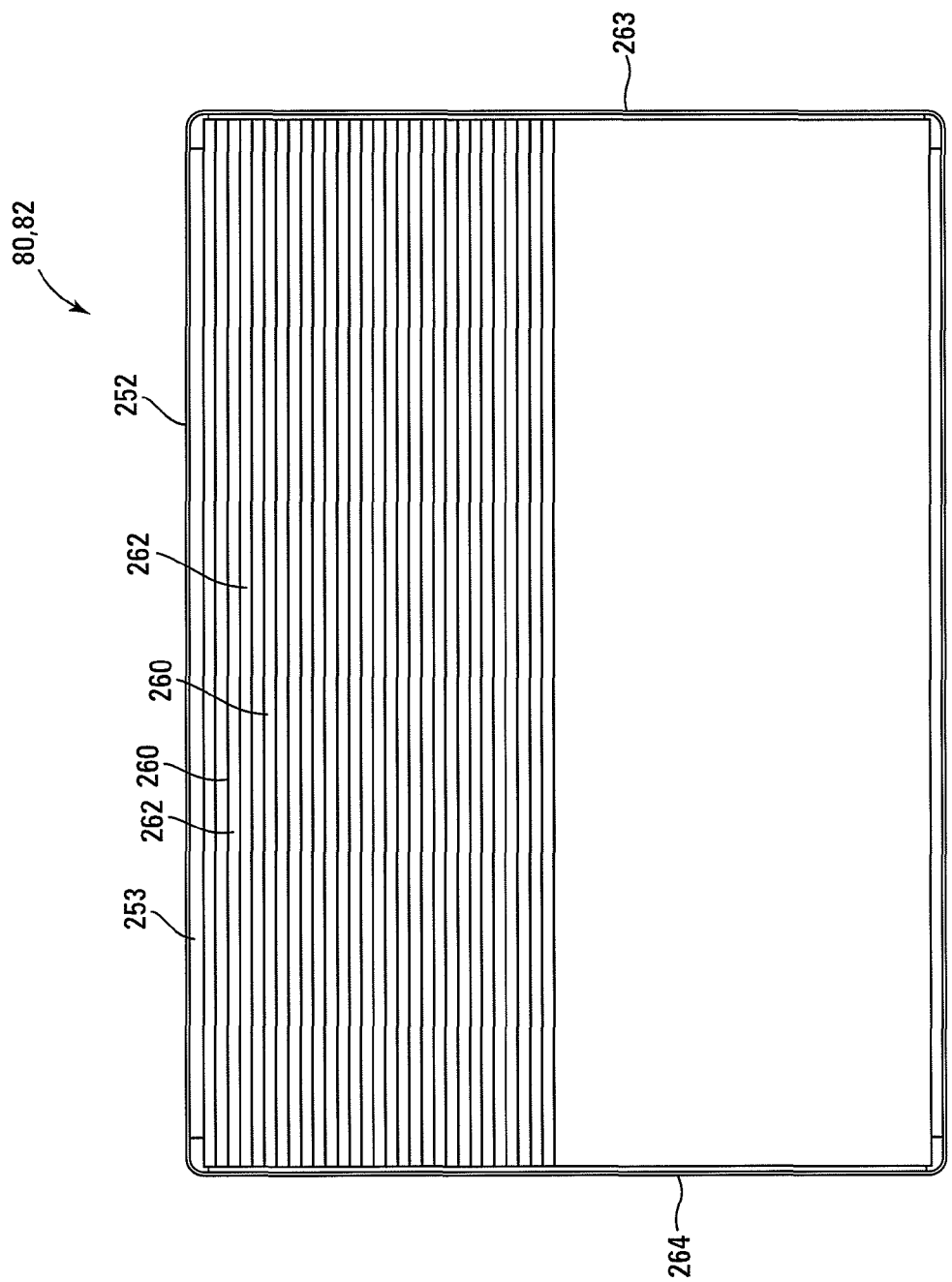
FIG. 8 shows an SCR substrate that can be used in the system of FIGS. 1A and 1B.

The SCR substrates 80, 82 preferably have a pass-through configuration that does not promote the collection of particulate matter on the SCR substrates 80, 82. FIG. 8 shows an example pass-through configuration that can be utilized by the first and second SCR substrates 80, 82. As shown at FIG. 8, the depicted substrate includes walls 260 defining a honeycomb arrangement of parallel, longitudinal passages 262 that extend from a downstream end 263 to an upstream end 264 of the substrate. The passages 262 are not blocked or plugged such that the exhaust flow freely passes longitudinally through the passages 263 without passing radially through walls 260. Thus, the passages 263 are open at both ends so as to facilitate the unobstructed pass-through of the exhaust gas. The substrates are shown housed within an outer casing 252. In certain embodiments, the substrates can have a ceramic monolith construction. A mat layer 253 can be mounted between the substrates and the casings.

In other embodiments, NOx reduction structures such as lean NOx catalyst substrates or lean NOx trap substrates can be used in place of or in combination with SCR substrates. In the case of lean NOx traps and lean NOx catalysts, hydrocarbons can be injected by the reductant injector for reaction at the NOx reduction station 30.

Referring back to FIGS. 1A and 1B, a NOx sensor 90 is shown mounted downstream from the NOx reduction station 30. The NOx sensor 90 can be used to monitor the effectiveness of the NOx reduction station 30.

In use of the diesel particulate aftertreatment system 20, exhaust from the diesel engine 24 is initially directed through the first housing 44 where the exhaust passes through the filtration station 28. At the filtration station, particulate material is filtered from the exhaust stream. After the exhaust passes through the filtration station 28, the concentration of NOx present in the exhaust is sensed by the NOx sensor 38. The electronic control unit 36 interfaces with the NOx sensor 38 so as to receive, collect and process the NOx concentration data generated by the NOx sensor 38. Flow then continues from the first housing 44 through the conduit 48 to the second housing 46. At the entrance to the second housing 46, the reductant injector 32 injects reductant into the exhaust stream. The exhaust stream containing the reductant then passes through the exhaust mixer 34 and the temperature of the exhaust is sensed by the temperature sensor 42. The electronic control unit 36 interfaces with the temperature sensor 42 so as to receive, collect and process the exhaust temperature data generated by the temperature sensor 42. From the temperature sensing location, the exhaust stream proceeds to the NOx reduction station 30 where the NOx in the exhaust stream reacts with the reductant in the presence of oxygen to reduce a substantial portion of the NOx into $N_2$ and $H_2O$.

The pressure data generator 40 generates pressure data that is representative of the pressure differential across the substrates 80, 82. In other embodiments, the pressure data generator 40 can generate data (e.g., an upstream pressure reading) that is used by the electronic control unit (e.g., through the use of a flow/pressure model) to provide data that is representative of the differential pressure across the substrates 80, 82. The electronic control unit 36 interfaces with the pressure data generator 40 so as to receive, collect and process the pressure data generated by the pressure data generator 40. Because the flow characteristics of the substrates 80, 82 (e.g., cross-sectional flow area) are known, the electronic control unit 36 can use the data representative of pressure differential to identify data representative of the flow rate of the exhaust passing through the system 20. By using the data representative of the flow rate of the exhaust passing through the system 20 in combination with the NOx concentration data generated by the NOx sensor 38, the electronic control unit 36 can identify the total amount of NOx present in the exhaust stream and can also identify the exhaust residence time at the NOx reduction station 30. Additionally, based on the temperature data generated by the temperature sensor 42 and the exhaust residence time at the NOx reduction station, the electronic control unit 36 can identify the conversion efficiency of the NOx reduction station 30. Using the the NOx conversion efficiency in combination with the data representative of the total NOx present in the exhaust, the electronic control unit 36 can identify the amount of reductant to be dispensed into the exhaust stream by the reductant injector 32. Preferably, the amount of reductant dispensed by the reductant injector 32 is selected to provide optimum reduction of NOx at the NOx reduction station 30 while minimizing the amount of excess reductant.

Figure 9:
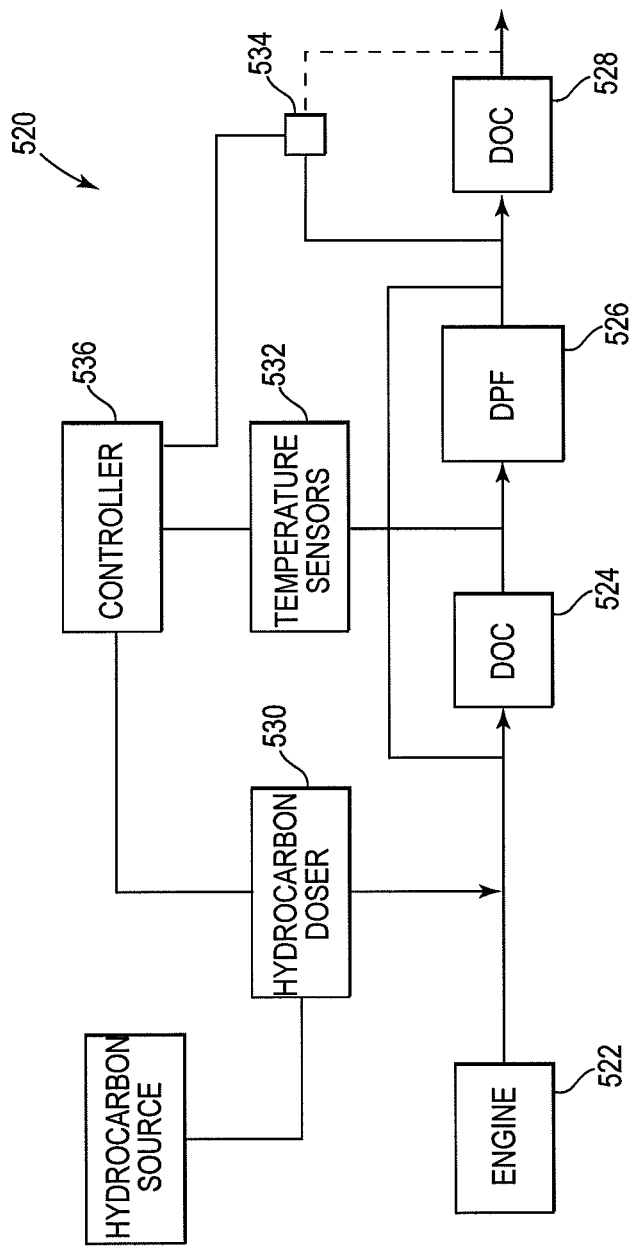
FIG. 9 shows an alternative system in accordance with the principles of the present disclosure.

FIG. 9 shows an alternative aftertreatment system 520 in accordance with the principles of the present disclosure for treating diesel exhaust from a diesel engine 522. The system 520 includes a first DOC 524 positioned upstream from a DPF 526. A second DOC 528 is positioned downstream from the DPF 526. A hydrocarbon doser 530 dispenses hydrocarbon into the exhaust at location upstream from the first DOC 524. A temperature sensor 532 takes exhaust temperature readings at locations upstream from the first DOC 524, between the first DOC 524 and the DPF 526 and between the DPF 526 and the second DOC 528. A pressure sensor 534 (e.g., a differential pressure sensor or pressure sensor used in combination with a model) takes pressure readings indicative of a pressure differential across the second DOC 528. A controller 536 interfaces with the temperature sensors 532 and the pressure sensor 534 and uses the data from the sensors 532, 534 as parameters for controlling the dosing rate of the doser 530. As described above, the data from the pressure sensor 534 can be used to determine an exhaust flow rate though the system 520. Also, the temperature data can be used to determine a reaction efficiency that will occur at the first DOC 524, to determine the temperature of the exhaust entering DPF 526 and to determine the temperature of the DPF 526. The dosing rate is selected such that the injected hydrocarbons are combusted at the first DOC 524 and generate sufficient heat to provide a controlled regeneration of the DPF 526.

In certain embodiments, the first and second DOC's 524, 528 can include substrates catalyzed with a diesel oxidation catalyst (e.g., a precious metal catalyst). The substrates of the DOC's 524, 528 can have a flow-through configuration similar to the substrate shown at FIG. 8. In one embodiment, the DPF 52 can include a wall-flow filter.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. An exhaust aftertreatment system for treating exhaust generated by a diesel engine, the system comprising:
    a filtration station for filtering particulate material from the exhaust;
    a substrate located downstream from the filtration station;
    a pressure data generator for generating data indicative of a pressure differential across a constant flow area control volume of the exhaust aftertreatment system, the constant flow area control volume including the substrate;
    a reactant dispenser for dispensing reactant into the exhaust; and
    a controller that controls a dosing rate at which the reactant dispenser dispenses the reactant into the exhaust, wherein the controller uses the data indicative of the pressure differential across the constant flow area control volume as a parameter for determining the dosing rate at which the reactant dispenser dispenses the reactant into the exhaust, and wherein the controller determines an exhaust flow rate based on a correlation of the data from the pressure data generator with the constant flow area control volume.

2. The system of claim 1, wherein the substrate has a pass-through configuration.

3. The system of claim 1, wherein the substrate is an SCR substrate.

4. The system of claim 1, wherein the dosing rate is directly dependent upon a magnitude of the pressure differential across the constant flow area control volume.

5. The system of claim 1, further comprising a NOx sensor for generating data representative of a concentration of NOx in the exhaust and a temperature sensor for generating data representative of a temperature of the exhaust, wherein the controller uses the data from the NOx sensor and the data from the temperature sensor as parameters for determining the dosing rate at which the reactant dispenser dispenses the reactant into the exhaust.

6. The system of claim 5, wherein the NOx sensor is positioned between the filtration station and the reactant dispenser.

7. The system of claim 6, wherein the temperature sensor is positioned between the reactant dispenser and a NOx reduction station.

8. The system of claim 7, wherein an exhaust mixer is positioned between the temperature sensor and the reactant dispenser.

9. The system of claim 8, wherein the filtration station includes a pre-filter positioned upstream from a wall flow filter.

10. The system of claim 9, wherein the NOx reduction station includes two SCR substrates positioned in series.

11. The system of claim 10, wherein the pressure data generator includes a pressure differential sensor having a first sensing location positioned upstream from the two SCR substrates and a second sensing location positioned downstream from the two SCR substrates.

12. An exhaust aftertreatment system for treating exhaust generated by a diesel engine, the system comprising:
- a filtration station for filtering particulate material from the exhaust;
- a NOx reduction station located downstream from the filtration station for reducing a concentration of NOx in the exhaust;
- a temperature sensor for generating first data representative of a temperature of the exhaust;
- a pressure data generator for generating second data indicative of a pressure differential across a control volume located at the NOx reduction station, the control volume including at least one catalyzed substrate;
- a NOx sensor for generating third data representative of the concentration of the NOx in the exhaust;
- a reductant dispenser for dispensing reductant into the exhaust at a location between the filtration station and the NOx reduction station; and
- a controller that controls a dosing rate at which the reductant dispenser dispenses the reductant into the exhaust, wherein the controller uses the first data, the second data and the third data to determine the dosing rate at which the reductant dispenser dispenses the reductant into the exhaust, and wherein the controller determines an exhaust flow rate based on a correlation of the second data from the pressure data generator with the control volume.

13. The system of claim 12, wherein the substrate has a pass-through configuration.

14. The system of claim 12, wherein the correlation is a mathematical formula independent of accumulating matter.

15. The system of claim 12, wherein the correlation assumes a constant flow area.

16. The system of claim 12, wherein the NOx sensor is positioned between the filtration station and the reductant dispenser.

17. The system of claim 16, wherein the temperature sensor is positioned between the reductant dispenser and the NOx reduction station.

18. The system of claim 17, wherein an exhaust mixer is positioned between the temperature sensor and the reductant dispenser.

19. The system of claim 18, wherein the filtration station includes a pre-filter positioned upstream from a wall flow filter.

20. The system of claim 19, wherein the NOx reduction station includes two SCR substrates positioned in series.

21. The system of claim 20, wherein the control volume includes the two SCR substrates.

22. The system of claim 20, wherein the pressure data generator includes a pressure differential sensor having a first sensing location positioned upstream from the two SCR substrates and a second sensing location positioned downstream from the two SCR substrates.

* * * * *